(No Model.)
F. A. RUDOLPH.
DENTAL TOOL.
No. 574,763. Patented Jan. 5, 1897.
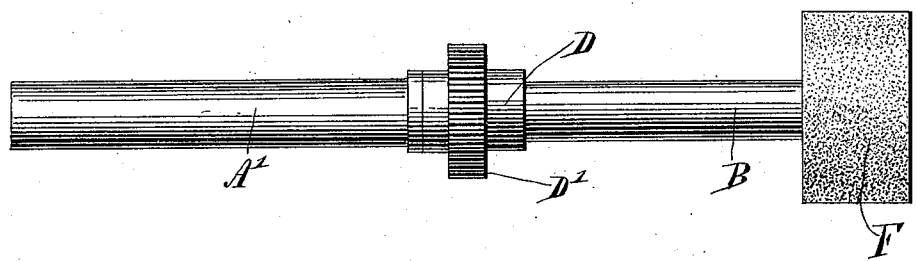
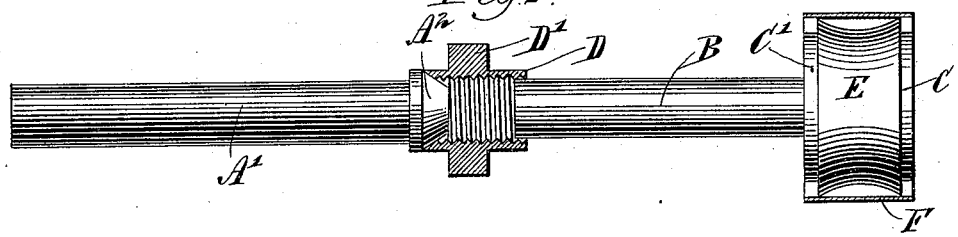
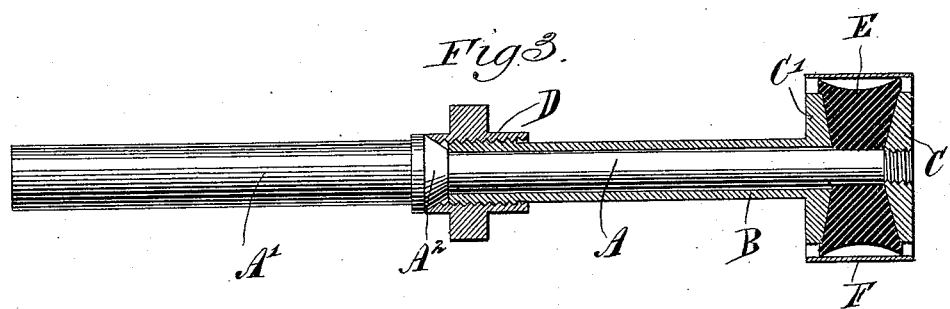
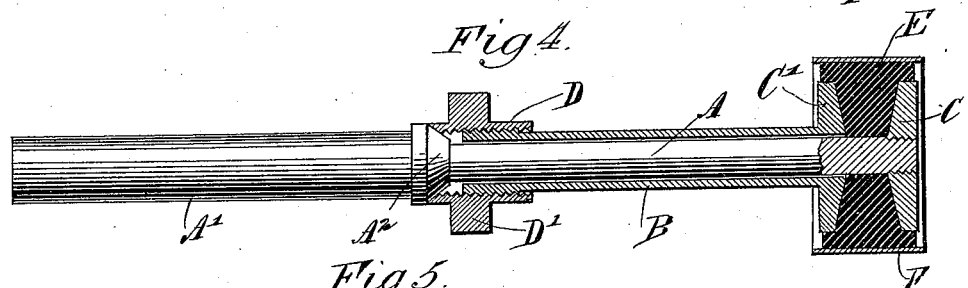
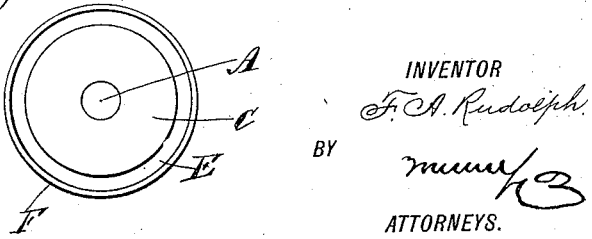

UNITED STATES PATENT OFFICE.

FLAVEL A. RUDOLPH, OF CARMI, ILLINOIS.

DENTAL TOOL.

SPECIFICATION forming part of Letters Patent No. 574,763, dated January 5, 1897.

Application filed May 19, 1896. Serial No. 592,157. (No model.)

*To all whom it may concern:*

Be it known that I, FLAVEL A. RUDOLPH, of Carmi, in the county of White and State of Illinois, have invented a new and Improved Dental Tool, of which the following is a full, clear, and exact description.

The object of the invention is to provide a new and improved dental tool more especially designed for use in a dental lathe or like machine to dress down rubber or metal plates.

The invention consists in a particular construction of expansible rubber head and in certain details of the expanding mechanism, as hereinafter described and claimed.

Reference is to be had to the accompanying drawings, forming a part of this specification, in which similar reference-characters indicate corresponding parts in all the views.

Figure 1 is a side elevation of the improved tool. Fig. 2 is a similar view thereof, showing the abrading covering and the adjusting-nut in cross-section. Fig. 3 is a view similar to Fig. 2, but showing also the rubber head and the expanding-sleeve in section. Fig. 4 is a view similar to Fig. 3, but showing the parts in a different position; and Fig. 5 is an end view of the tool.

The improved tool consists of a spindle A, having an enlarged end A', adapted to be fastened in the chuck of the lathe-spindle, so that the shaft is revolved when the lathe is set in motion. Said shaft is provided with a conical collar $A^2$, which tapers toward the reduced end A of the spindle.

To the free end of the said reduced portion is secured a clamp member C, whose inner face is tapered or conical, as shown. The portion A of the spindle is surrounded by a longitudinally-movable sleeve B, the outer end whereof carries a clamp-section C' similar to the section C, it being understood that said sections are conical, with the apexes toward each other.

The opposite end of the sleeve B is screw-threaded and engages a nut D, provided wit a milled collar D', and also beveled on its inside to properly engage the conical collar $A^2$. Between the clamp-sections C and C' is held an expansible rubber head E, which, as shown in Figs. 2 and 3, has a concave periphery when in its initial unexpanded position. On the outside of the said rubber head is fitted the abrading cover F, which is made of sandpaper or equivalent material.

By manipulating the nut D the operator can move the clamp-sections C and C' toward or from each other, since said nut D is held against longitudinal movement by its abutment against the collar $A^2$ of the spindle A. The nut is always held against said collar by the spring action of the rubber head E, which obviously tends to force the sleeve B away from the clamp-section C.

When the nut D is so turned as to force the sleeve B outward, as shown in Fig. 4, the rubber head E is compressed at its central portion, and in consequence thereof the marginal portion of the said head is expanded, causing the concave groove in the periphery of the head to gradually become shallower until the said peripheral surface is perfectly cylindrical, as shown, and affords a continuous contact or grip surface for the abrading cover F. During this expansion of the rubber head its marginal portion is also forced around the edges of the clamp-sections, forming annular flanges, as shown in Figs. 4 and 5.

By having the collar $A^2$ made conical the nut D will be centered automatically, and whenever said nut is turned the sleeve B will be constantly kept in axial relation to the spindle A.

Having thus described my invention, I claim as new and desire to secure by Letters Patent—

1. A dental tool, comprising a shaft, two clamp-sections, one adjustable relatively to the other longitudinally of the shaft, said sections being provided with bevels in their opposing faces, said bevels converging toward the shaft, an expansible head held between said sections, and means for moving the sections relatively to each other to expand the head, substantially as shown and described.

2. A dental tool, comprising a shaft, a clamp held therein, comprising two sections one movable relatively to the other longitudinally of the shaft, means for moving one clamp-section relatively to the other, and a head held between said clamp-sections and made of expansible material such as rubber, said head being provided with a concave periphery so that the periphery of the head will become cylindrical when the head is expanded, substantially as shown and described.

3. A dental tool, comprising a spindle carrying a clamp-section and provided with a conical collar facing said clamp-section, a sleeve longitudinally movable on said spindle between said collar and said clamp-section, the sleeve carrying another clamp-section at one of its ends, an expansible head held between the two clamp-sections, and a nut screwing on the said sleeve and engaging the conical collar of the shaft, substantially as shown and described.

FLAVEL A. RUDOLPH.

Witnesses:
JNO. K. BALL,
A. S. RUDOLPH.